(12) United States Patent
Shibuya et al.

(10) Patent No.: US 8,641,280 B2
(45) Date of Patent: Feb. 4, 2014

(54) LINEAR MOTION GUIDE UNIT WITH LONG-LASTING LUBRICATING SYSTEM

(75) Inventors: Yuichi Shibuya, Gifu-ken (JP); Ayumi Shimaguchi, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 21 days.

(21) Appl. No.: 13/354,483

(22) Filed: Jan. 20, 2012

(65) Prior Publication Data

US 2012/0195535 A1 Aug. 2, 2012

(30) Foreign Application Priority Data

Jan. 27, 2011 (JP) .................. 2011-014765

(51) Int. Cl.
*F16C 29/06* (2006.01)
*F16C 29/02* (2006.01)

(52) U.S. Cl.
USPC .............................................. 384/13; 384/45

(58) Field of Classification Search
USPC ........................................ 384/13, 15, 43–45
See application file for complete search history.

(56) References Cited

U.S. PATENT DOCUMENTS

| | | | | |
|---|---|---|---|---|
| 5,399,023 | A * | 3/1995 | Winkelmann et al. | 384/15 |
| 6,024,490 | A * | 2/2000 | Shirai | 384/13 |
| 6,082,899 | A * | 7/2000 | Suzuki et al. | 384/13 |
| 6,290,394 | B1 * | 9/2001 | Obara et al. | 384/13 |
| 7,066,650 | B2 * | 6/2006 | Ishihara | 384/44 |
| 7,534,042 | B2 * | 5/2009 | Kuwabara | 384/13 |
| 2008/0080795 | A1 * | 4/2008 | Kuwabara et al. | 384/13 |
| 2008/0298729 | A1 * | 12/2008 | Kakei | 384/44 |

FOREIGN PATENT DOCUMENTS

| | | |
|---|---|---|
| JP | 10-205534 A | 8/1998 |
| JP | 2007-100951 A | 4/2004 |

* cited by examiner

*Primary Examiner* — Marcus Charles
(74) *Attorney, Agent, or Firm* — Browdy and Neimark, PLLC

(57) ABSTRACT

Lubrication for rolling elements is carried out in a turnaround passage in an end cap. An applicator nose to come into touch with the rolling elements has a molding density greater than in a lubricant reservoir plate to ensure proper and steady lubrication, with accompanying sustainable maintenance-free condition for lubrication. The lubricant reservoir plate impregnated with lubricant fits into a concavity inside the end cap. The applicator nose is integral with the lubricant reservoir plate and extends through a hole cut in the end cap to reach a turnaround passage to be exposed at a leading edge thereof to the rolling element to resupply the lubricant around the rolling elements.

6 Claims, 15 Drawing Sheets

(A)

(B)

LINEAR MOTION GUIDE UNIT WITH LONG-LASTING LUBRICATING SYSTEM

FIELD OF THE INVENTION

The present invention relates to a linear motion guide unit comprised of an elongated guide rail and a slider designed to move on the elongated guide rail relatively to the guide rail by virtue of more than one rolling element, and in which the slider has a lubricant applicator made of open-cellular or porous compact of sintered resinous material to provide a more longer lubrication-life for a lubricating system.

BACKGROUND OF THE INVENTION

Conventionally, linear motion guide units have been composed of an elongated guide rail or guide shaft, and a slider that fits over or conforms to the guide rail to move relatively to the guide rail in a sliding manner through more than one rolling element of ball or roller, which is allowed to recirculate through a looped circuit that is composed of a load-carrying race defined between the guide rail and the slider, turnaround passages and a return passage cut inside the slider. With the linear motion guide units constructed as stated earlier, continuous application of lubricant on or between the load-carrying race and the rolling element is indispensable to continue maintaining an adequate lubricant film around the rolling elements to keep them against metal-to-metal contact that might otherwise occur, thereby making certain of the rated lifetime of the linear motion guide unit. Most prior linear motion guide units have been ordinarily fed with lubricant every a preselected interval through any oiling port to ensure the lubricant film between the load-carrying race and the rolling element. Recently advanced machines and instruments, nevertheless, are increasingly needed to make them virtually maintenance-free from an aspect of keeping maintenance cost for lubrication reasonably less than ever. Correspondingly, the linear motion guide units incorporated in the advanced machinery are also challenged to realize the virtual maintenance-free for lubrication over a long-lasting service interval.

In Japanese Laid-Open Patent Application No. 2007-100 951 which is a commonly-assigned senior application, there is disclosed an example of the linear motion guide unit envisaged relieving the maintenance-free problem for lubrication. With the linear motion guide unit described in the commonly-assigned senior application, the application of lubricant around the rolling elements was done at the turnaround passage to make the lubrication system simpler than ever in construction, along with maintenance-free for steady and positive oil lubrication. With the prior linear motion guide unit constructed as stated earlier, a lubricant reservoir plate of a porous compact impregnated with lubricant fits into a concavity sunk below an outward end surface of the end cap. The concavity is deep pitted to open into the turnaround passage in the end cap. The porous compact impregnated with lubricant is placed in the concavity in the end cap to expose in part itself to the turnaround passage through the deep pit. Thus, the porous compact makes contact with the rolling elements running through the turnaround passage to come to supply with the lubricant around the rolling elements.

In Japanese Laid-Open Patent Application No. H10-205 534 which is also a commonly-assigned senior application, moreover, there is disclosed a linear motion guide unit having a lubricating plate which can be mounted and/or demounted out of the linear motion guide unit without any reconfiguration in the basic design specifications. With the linear motion guide unit, the lubricating plate is secured to a carriage, with lying between an end seal and a spacer member which are placed on an outward end of an end cap. The lubricating plate makes sliding engagement with at least a raceway groove on the guide rail while moving relatively to the guide rail. The lubricating plate is constituted with a sintered resinous compact of porous texture impregnated with lubricant. The sintered resinous compact is made of a sintered resinous member of finely powdery synthetic resin, which is packed in a mold and compacted under pressure together with the application of heat. The lubricating plate has dense parts and coarse parts which are placed on the lengthwise sides of the guide rail in opposition to each other and embraced together within a covering member.

With the linear motion guide unit recited in the former patent document, application or resupply of the lubricant around the rolling elements is done inside the turnaround passage in the end cap. More especially, the lubricant reservoir plate impregnated with lubricant and installed in the end cap has an applicator nose extending to be exposed in the turnaround passage through the opening pitted in the end cap. The rolling elements, while running through the turnaround passage in the end cap, come into touch with the applicator nose of the lubricant reservoir plate, thereby being lubricated with oily lubricant through the applicator nose of the lubricant reservoir plate. In the linear motion guide unit constructed as stated just earlier, however, as more lubricant than a prerequisite amount of lubricant for rolling contact between the rolling elements and the load-carrying race continues fed around the rolling elements at the early stage of the traveling operation, the lubricant preserved in the lubricant reservoir plate continues decreasing rapidly in amount down to a certain amount, and since then diminishing at roughly regular rate per unit interval. As a result, the lubricant preserved in the lubricant reservoir plate, because being consumed quickly at the early phase of the traveling operation, would reduce more rapidly, compared with an ideal state where the lubricant constantly decreases at a regular rate per unit interval ever after the early time of the traveling operation. That would raise a problem in which maintenance-free intervals become less.

Meanwhile, the advanced linear motion guide units are needed conforming to the prolonged operation with reduced maintenance schedules for lubrication in aspects of a reduction in maintenance steps on lubricant application in machines and facilities with built-in linear motion guide units, and cutting the amount of lubricant for the purpose of conserving resources and reducing environmental impact. With the linear motion guide unit that the lubricant is applied directly around the rolling elements inside the turnaround passage, it has been desired to develop the lubricant applicator capable of accumulating therein ample amount of lubricant and staving off the excessive amount of applied lubricant tending to increase at the early stage of the traveling operation suited for virtually maintenance-free operation, thereby making sure of smooth application of an adequate amount of lubricant with accompanying maintenance-free condition for lubrication.

SUMMARY OF THE INVENTION

The present invention has for its primary object to overcome the major challenges as stated earlier, and to provide a linear motion guide unit in which the application of lubricant around rolling elements recirculating through looped circuits is done in turnaround passages in an end cap. More particularly, the present invention provides a linear motion guide unit with long-lasting lubricating system, in which a lubricant applicator of porous compact is installed in an end cap, the lubricant applicator being composed of a major lubricant reservoir plate and an applicator nose integral with the lubricant reservoir plate, the end cap having a deep pit open to a turnaround passage, the applicator nose of the lubricant applicator extending through the deep pit in the end cap to be exposed in part to the turnaround passage to form partly a curved wall surface of the turnaround passage, the applicator nose at least partially having a molded density higher compared with the lubricant reservoir plate to restrict open-bores or open-cells in number and size so as to keep the application of lubricant to the rolling element through the applicator nose at a moderate amount, thereby staving off the excess amount of applied lubricant tending to increase at the early stage of the operation, thereby controlling smooth application of an adequate amount of lubricant and making sure of more sustainable lubrication life, with accompanying maintenance-free condition for lubrication over a long-lasting period.

The present invention relates to a linear motion guide unit prolonged in service life for lubrication comprising an elongated guide rail, a slider movable lengthwise of the elongated guide rail in a sliding manner, and a rolling element allowed to roll through a load-carrying race defined between the guide rail and the slider; wherein the slider has a carriage, end caps and end seals, the carriage having a return passage extending in parallel with the load-carrying race, the end caps being fastened on forward and aft end surfaces of the carriage, one to each end surface, and provided therein with turnaround passages to join together the load-carrying race and the return passage, and the end seals being attached on outward end surfaces of the end caps; wherein the end caps each have a lubricant applicator constituted with a Lubricant reservoir plate and an applicator nose, the lubricant reservoir plate being made of a porous compact which has open pores impregnated with lubricant, the applicator nose being made of a porous compact which has open pores and protrudes from the lubricant reservoir plate, the applicator nose having a leading edge which extends through a hole in the end cap to come into touch with the rolling element rolling though the turnaround passages, and the lubricant reservoir plate being integral with the applicator nose through coalescence of fine particles of ultra molecular weight synthetic resins in the porous compact; wherein the applicator nose has at least a part in the porous compact, which is densified in molded density to have pores less in pore size and pore number than in the lubricant reservoir plate so as to restrict an amount of lubricant flowing across the layer; and wherein the leading edge of the applicator nose comes into touch with the rolling element to apply the lubricant around the rolling element while rolling through the turnaround passages.

In the present invention, there is disclosed a linear motion guide unit in which the applicator nose has at least a layer lying within an overall length reaching the leading edge of the applicator nose, the layer being densified in the molded density. Moreover, there is disclosed a linear motion guide unit in which the layer densified in the applicator nose of the porous compact preferably has the molded density of from 0.60 to 0.70 g/cm$^3$, and the lubricant reservoir plate of the porous compact has the molded density of from 0.40~0.60 g/cm$^3$. In another aspect of the present invention, there is disclosed a linear motion guide unit in which the lubricant reservoir plate fits into a concavity which gets concaved below the outward end surface of the end cap to open onto the end seal, and the hole in the end cap is open to an outside curved half-surface of the turnaround passage. As an alternative, the lubricant reservoir plate fits into a concavity which gets concaved in the end cap to open onto the carriage, and the hole in the end cap is open to an inside curved half-surface of the turnaround passage.

In the present invention, there is disclosed a linear motion guide unit in which the applicator nose fits into a recession or a bottomless hole in the lubricant reservoir plate and coalesces with the lubricant reservoir plate. As an alternative, the lubricant reservoir plate is reduced in transverse area to fit over the applicator nose, thereby throttling a lubricant flow from the lubricant reservoir plate into the applicator nose. In a further another aspect of the present invention, there is disclosed a linear motion guide unit in which the porous compact constituting the lubricant reservoir plate with the applicator nose is made of a sintered resinous member of finely powdery ultrahigh molecular weight polyethylene whose spherical particles are partially fused together under pressure together with the application of heat to provide an open-porous texture in which the pores are open to each other through interstices among the fused particles to be filled with the lubricant, and as the mass per unit volume of the porous compact, or the molded density, becomes large to be densified, the interstices or channels among the fused particles become narrower to lessen the pores or cells opened to the outside.

With the linear motion guide unit constructed as stated earlier, the applicator nose integral the lubricant reservoir plate controls or restricts constantly the amount of lubricant resupplied to the rolling elements to an adequate and desired level, helping keep the amount resupplied around the rolling elements constant and stable ever just after the beginning of the traveling operation and further retain the remaining percentage of the lubricant high even after considerable long-lasting traveling, thereby contributing to the extension of service life for lubrication with accompanying maintenance-free condition for lubrication. More especially, the slider has the end caps on whose end surfaces there are installed the lubricant reservoir plates of porous compact. The lubricant reservoir plates each have the applicator noses which each have the leading edge extending through the end cap to form in part the curved surface of the turnaround passage. The lubricant reservoir plate is constituted with the porous compact having therein open pores, intercommunicating voids or interstices self-supporting in shape. Moreover, the applicator nose has at least a layer which is densified to have the molded density more than in the lubricant reservoir plate. The applicator nose, as reduced in the number and size of the open pores at the densified layer, controls or restricts the amount of lubricant flowing through the applicator nose to the adequate level, making it easier to resupply stably the lubricant to the rolling elements, thereby enabling the extension of service life for lubrication with accompanying maintenance-free condition for lubrication.

BRIEF DESCRIPTION OF THE DRAWINGS

FIG. 13(A) shows a version of the lubricant applicator in which the applicator nose fits into a sink in the lubricant reservoir plate and FIG. 13(B) shows another version of the lubricant applicator in which the applicator nose fits into an opening perforated through the lubricant reservoir plate.

FIG. 14(A) shows a version of the modified lubricant reservoir plate, whose rear surface is depressed across a contour corresponding to the applicator nose raised above a front surface of the lubricant reservoir plate and FIG. 14(B) shows another version of the modified lubricant reservoir plate whose rear surface is depressed across a contour larger than the applicator nose raised above a front surface of the lubricant reservoir plate, these depressions are designed to reduce a transverse area at a transition from the lubricant reservoir plate to the applicator nose, throttling or restricting a lubricant flow at the transition.

FIG. 15(A) is a view in transverse section illustrating a dense layer formed over the entire transverse area of the applicator nose, FIG. 15(B) is a view in transverse section illustrating a dense layer formed around the middle transverse area of the applicator nose, FIG. 15(C) is a view in transverse section illustrating a dense layer formed on a leading edge of the applicator nose, which comes into contact with the rolling elements and FIG. 15(D) is a view in transverse section illustrating a dense layer formed along a boundary between the applicator nose and the lubricant reservoir plate.

FIG. 17(A) is a view in front elevation while FIG. 17(B) is a view in side elevation.

DETAILED DESCRIPTION OF THE PREFERRED EMBODIMENTS

The linear motion guide unit of the present invention is adapted for use in any relatively sliding components in machinery as diverse as machine tools, various assembling machines, conveyers, robotic machines, semiconductor fabricating equipment, precision machines, measurement/inspection instruments, medical instruments, micromachines, and so on. The linear motion guide unit of the present invention is especially intended to more prolong scheduled intervals of substantial maintenance-free operation for lubrication to conduct better lubrication around the rolling elements to ensure smooth circulation of the rolling elements through the looped or closed circuit.

Figure 2:
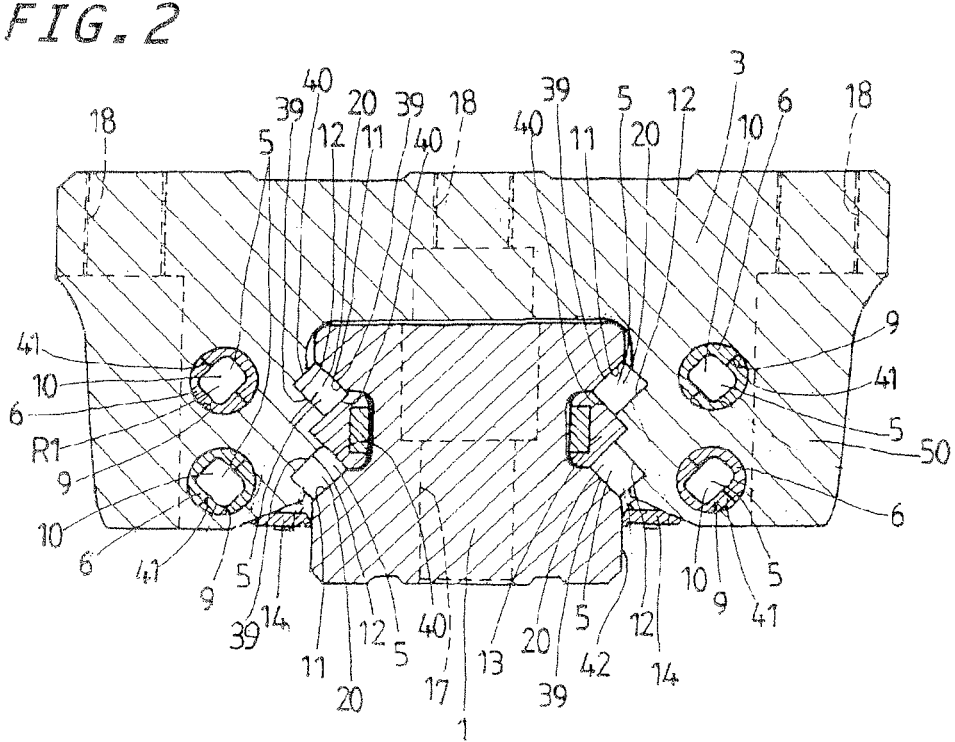
FIG. 2 is an enlarged view in transverse section taken along the plane of the line II-II of FIG. 1.

A preferred embodiment of the linear motion guide unit constructed according to the present invention will be described in detail by reference to the drawings. The linear motion guide unit of the present invention has an elongated guide rail 1, a slider designed to travel lengthwise of the guide rail 1 in a sliding manner, and rolling elements rolling through a looped circuit or circulating circuit 49 (shown in detail in FIG. 3), which is made up of a load-carrying race 20 defined between the guide rail 1 and the slider 2, a return passage 10 made in the slider 2 to extend in parallel with the load-carrying race 20, and turnaround passages 30 in the slider 2 to communicate the load-carrying race 20 with the return passage 10. With the linear motion guide unit constructed as stated earlier, the elongated guide rail 1 has widthwise opposing sides 12 on which paired raceway surfaces 11 are made to extend lengthwise of the guide rail 1, one pair to each side. The slider 2 has sidewise opposite bulges 50 that fit over or conform to the guide rail 1 to move or travel in a sliding manner lengthwise of the guide rail 1 by virtue of more than one rolling element of roller 5. The roller 5 is allowed to roll through the circulating circuit 49 that is made up of the load-carrying race 20 defined between the guide rail 1 and the slider 2, return passage 10 extending lengthwise in the slider 2, and the turnaround passages 30 connecting the load-carrying race 20 with the return passage 10. The slider 2 is chiefly composed of a carriage 3 having the sidewise bulges 50 extending beyond the width of the guide rail 1, the bulges 50 being each provided thereon with paired raceway surfaces 12 lying in opposition to the raceway surfaces 11 on the guide rail 1 and further provided therein with the return passages 10 extending in parallel with the raceway surfaces 12. The slider 2 has end caps 4 each of which has therein the turnaround passages 30 (30A, 30B) to interconnect one of upside and downside load-carrying races 38 defined between the raceway surfaces 11 and 12 to any associated one of upside and downside return passages 10 after the end caps 4 have been fastened to the carriage 3. The slider 2 has end seals 15 secured to outward surfaces 47 of the forward and aft end caps 4 with respect to the traveling direction and further provided with lips 16 to close clearances between the guide rail 1 and the slider 2, and more than one roller 5 allowed rolling through the circulating circuits 49. In the sidewise opposite bulges 50 of the slider 2, there are provided the paired circulating circuits 49, one pair to each bulge, as clearly shown in FIG. 2.

Figure 3:
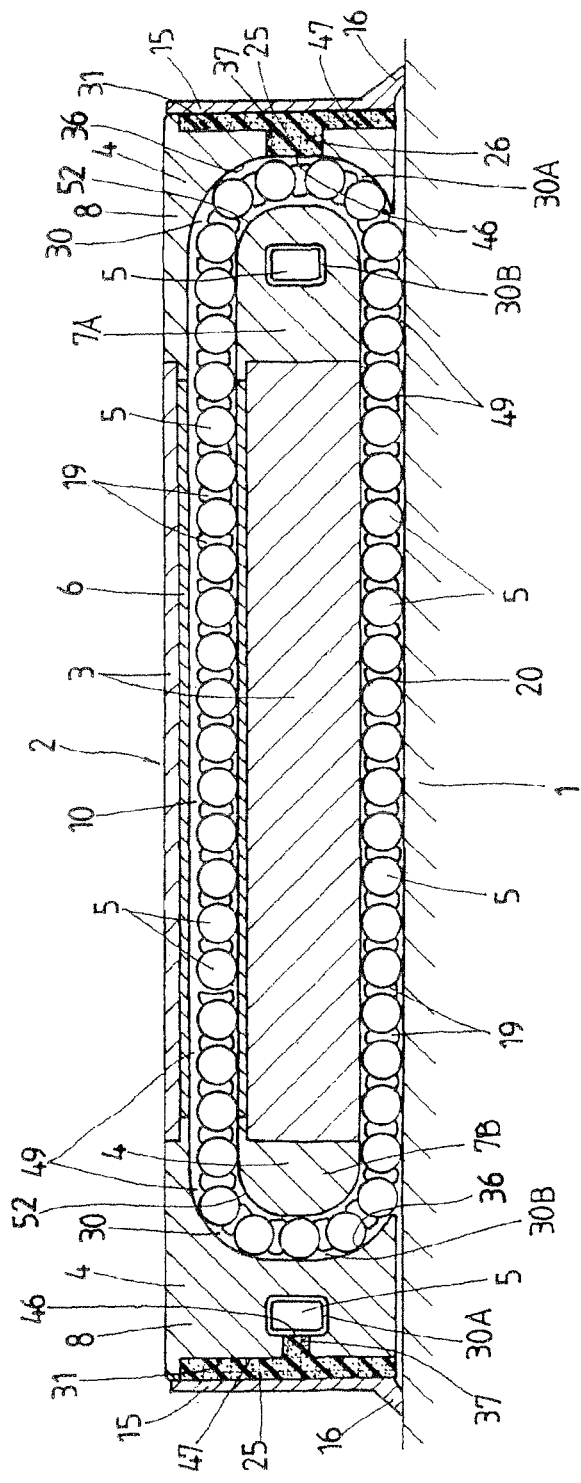
FIG. 3 is a view in longitudinal section of the linear motion guide unit of FIG. 1 to illustrate a looped circuit for rolling elements.

With the linear motion guide unit constructed as stated earlier, the rollers 5 running through one of the paired circulating circuits 49 are allowed to transfer from the downside race 20, carrying downward load because of the slider 2, into the upside return passage 10 in the carriage 3 in a circulating manner. In contrast, the rollers 5 rolling through the other of the paired circulating circuits 49 are allowed to transfer from the upside race 38, carrying upward load because of the slider 2, into the downside return passage 10 in the carriage 3 in a circulating manner. When the rollers 5 are right circular cylinders, they are born on either one of axially opposite ends 40 thereof in sliding-contact relation against a retainer plate 13 extending across the carriage 3 and the end caps 4, while come into rolling-contact around their circular outside surfaces 39 with the races 20. One of the paired circulating circuits 49, as shown in FIG. 3, is made up of one of the paired load-carrying races 20, the associated return passage 10, and a shorter one 30B of the turnaround passages 30 and a longer one 30A of the turnaround passages 30. In contrast, the other of the paired circulating circuits 49 is constructed as same as the one stated earlier. The paired circulating circuits 29 are intersected with one another in a way staggered from each other in lengthwise direction. Separators 19, as shown in FIG. 3, are each interposed between any two adjoining rollers 5 to keep the rollers against direct contact or collision of them.

Figure 1:
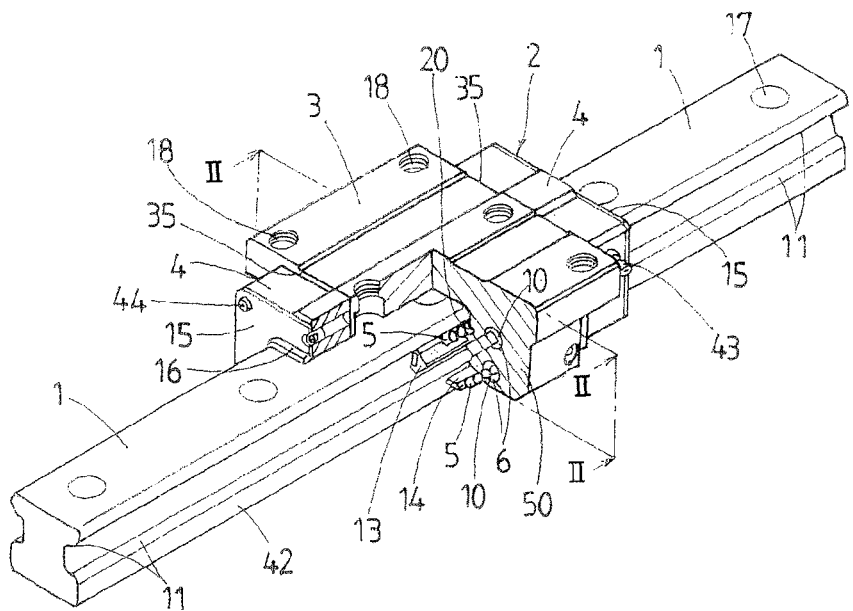
FIG. 1 is a partially cutaway view in perspective illustrating a preferred embodiment of a linear motion guide unit constructed according to the present invention.
Figure 7:
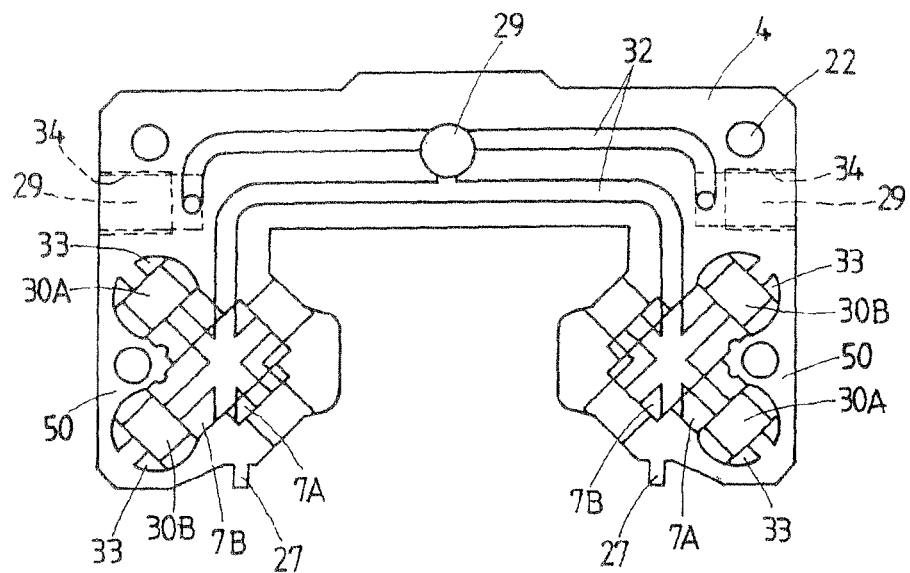
FIG. 7 is a view in rear elevation of the end cap of FIG. 5.

With the linear motion guide unit of the present invention, moreover, a lower seal 14 is disposed to extend over the underneath of the carriage 3 and the forward and aft end caps 4 while the end seals 15 are attached to the outward end surfaces of the end caps 4, so that the slider 2 is sealed effectively against outside atmosphere. The end caps 4 have lubrication ports 29 to resupply lubricant into the circulating circuits 49 through oil grooves or oiling paths 32. The lubrication ports 29 are provided with internally threaded holes 28 that fit over their associated grease nipples 43, one of which is shown as being positioned in a flank of the end cap 4 in FIG. 1. Moreover, the guide rail 1 is made with some holes 17 that are used to fasten the guide rail 1 to any stationary bed. The carriage 3 of the slider 2 is made therein with some threaded holes 18 that are used to fasten the slider 2 to any component including a workpiece, a variety of instruments, and so on. On the end caps 4, there are made with raised portions 27 below the underneath of the end cap 4 to hold in place the lower seal 14, and also bolt holes 22 at four corners of the end caps 4 to allow bolts to fasten the end caps 4 to the carriage 3. The end caps 4, as shown in FIG. 7, are each made at the middle area 23 thereof with the central lubrication port 29 to introduce the lubricant from the grease nipple 43 in the end cap 4, and further have the oiling paths 32 to connect the lubrication port 29 to the turnaround passage 30 in the associated circulating circuit 49.

Figure 6:
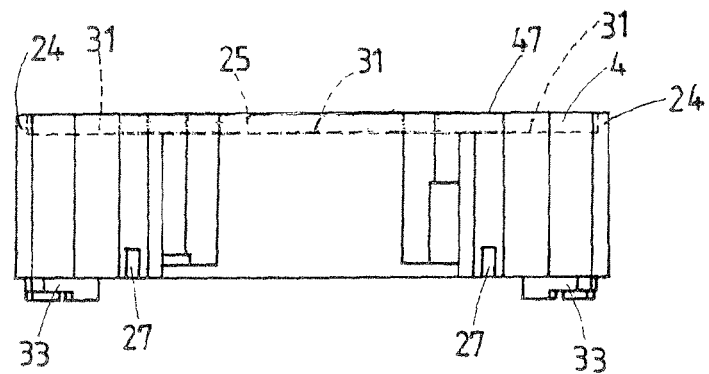
FIG. 6 is a view in bottom plan of the end cap of FIG. 5.
Figure 8:
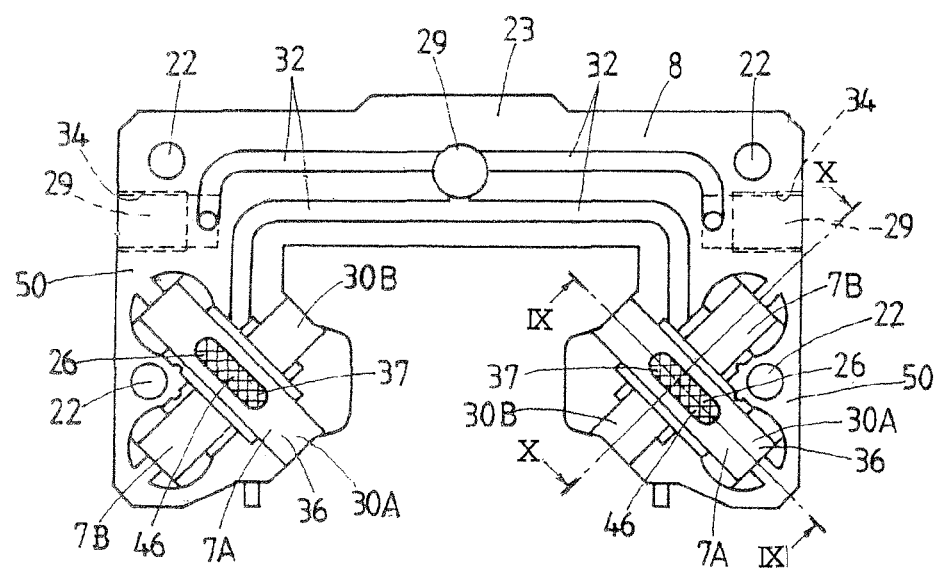
FIG. 8 is a view in rear elevation of an end cap major part of the end cap of FIG. 7, but a spacer part to be nested in the end cap major part is removed.

The return passage 10 is constituted with a circular hole defined inside a sleeve 6 that fits into a fore-and-aft bore 9 made in the carriage 3 of the slider 2. The sleeve 6 is made of sintered resinous tubular member having cellular or porous structure, whether monolithic or split at 41 into two halves. The sleeve 6, although fitting loosely inside the fore-and-aft bore 9, is held in accurate place by spigots 33 raised above the end caps 4 fastened to lengthwise opposite end surfaces 35 of the carriage 3. The end cap 4, as shown in FIGS. 6 to 8, is comprised of paired spacer parts 7 (7A, 7B) to define inside curved half-surfaces 52 of the turnaround passages 30 and an end cap major body 8 to define outside curved half-surfaces 36 of the turnaround passages 30. The end cap major body 8 is recessed below a rear surface of the end cap 4 to accommodate therein an assembly of the spacer part 7A to define the longer turnaround passage 30A and the spacer part 7B nested in the spacer part 7A to define the shorter turnaround passage 30B that gets intersected at right angles with the longer turnaround passage 30A and further staggered from the longer turnaround passage 30A in lengthwise direction of the slider 2. More especially, the turnaround passages 30 in the end cap 4 are entirely formed by the combination of the end cap major body 8 to shape the outside curved half-surfaces 36 of the turnaround passages 30 with the paired spacer parts 7A, 7B to shape the inside curved half-surfaces 52 of the turnaround passages 30. Thus, the spacer part 7A is involved in the provision of the longer turnaround passage 30A while the spacer part 7B nested in the spacer part 7A to get intersected with the spacer part 7A is involved in the shorted turnaround passage 30B. With the linear motion guide unit of the present invention, the slider 2 has the sidewise opposing bulges 50 in which there are provided the paired circulating circuits 49 each of which is made up of the load-carrying race 20, the return passage 10, the longer turnaround passages 30A defined with the end cap major body 8 and the spacer part 7A, and the shorter turnaround passages 30B defined with the first spacer part 7A and the second spacer part 7B.

Figure 9:
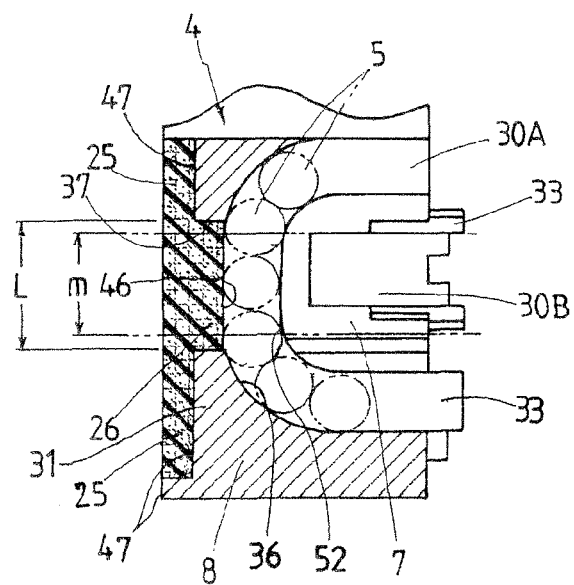
FIG. 9 is a view in transverse section of the end cap major part of FIG. 8 taken along the plane of the line IX-IX of FIG. 8.
Figure 10:
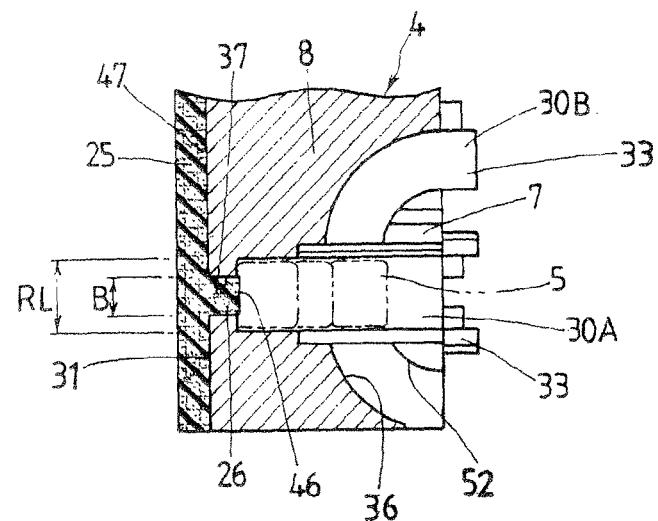
FIG. 10 is a view in transverse section of the end cap major part of FIG. 8 taken along the plane of the line X-X of FIG. 8.
Figure 11:
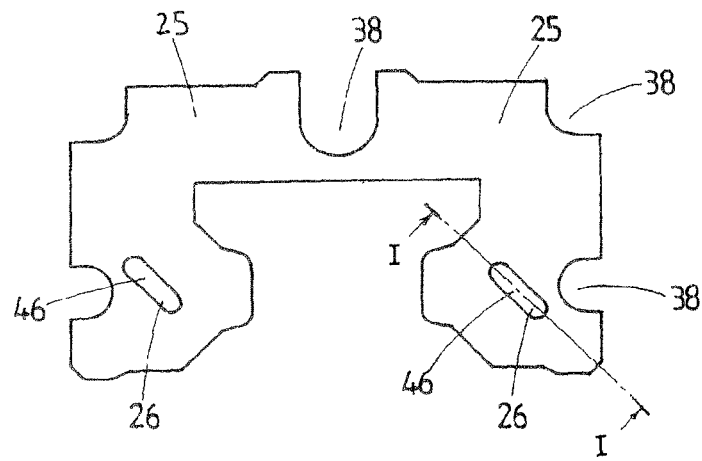
FIG. 11 is a view in rear elevation of a lubricant reservoir plate in the lubricant applicator of FIG. 4.
Figure 12:
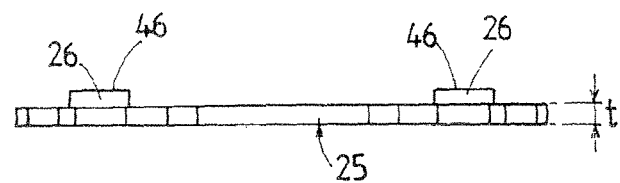
FIG. 12 is a view in bottom plan of the lubricant applicator of FIG. 11.

The end cap major body 8 as shown in FIGS. 9 and 10 is provided with spigots 33 to come into connection with the return passages 10. The spigots 33 are integral with the outside curved surfaces of the turnaround passages 30 to conjoin with the spacer parts 7A, 7B thereby communicating with the return passages 10 to connect smoothly the turnaround passages 30 in the end cap 4 to their associated return passages 10 in the carriage 3. On the rear surface of the end cap 4, as shown in FIG. 7, there are provided the central lubrication port 29 and the oiling grooves 32 extending from the lubrication port 29. The oiling paths defined inside the oiling grooves 32 get opened to conjunctions between any of the load-carrying race 20 and the return passage 10 and the turnaround passages 30 to supply the lubricant into the conjunctions. Lubrication ports 29 may be made on any place of the middle and sides thereof. However, all lubrication ports 29 but one put to lubrication use are plugged with closures 29 screwed into a threaded holes 28. The end caps 4 are kept in place to the carriage 3 and fastened to the lengthwise opposite end surfaces of the carriage 3, with using threaded bolts 44 using threaded bolts 44 which are extended through holes 22 in the end caps 4 and tightened into the carriage 3. Upon precise location and connection of the end caps 4 to the carriage 3, abutment of the sleeve 6 against the spigots 33 of the end caps 4 keeps accurate location of the end caps 4 to the sleeve 6, making sure of precise alignment of the spigots 33 of the end caps 4 with the return passages 10 in the carriage 3. Thus, end-to-end abutment between the sleeve 6 and the spigots 33 of the end caps 4 comes into flush connection of the return passage 10 with the turnaround passages 30 to finish the circulating circuits 49 of rectangle in transverse section with causing no discontinuity or gap at the connection between them. Coplanar continuity with no gap between the turnaround passages 30 in the end caps 4 and the return passages 10 defined by the sleeves 6 inside fore-and-aft bores 9 in the carriage 3 helps the rollers 5 transfer smoothly from the turnaround passages 30 to their associated return passages 10 and also from the return passages 10 to the turnaround passages 30 in a circulating manner.

Figure 4:
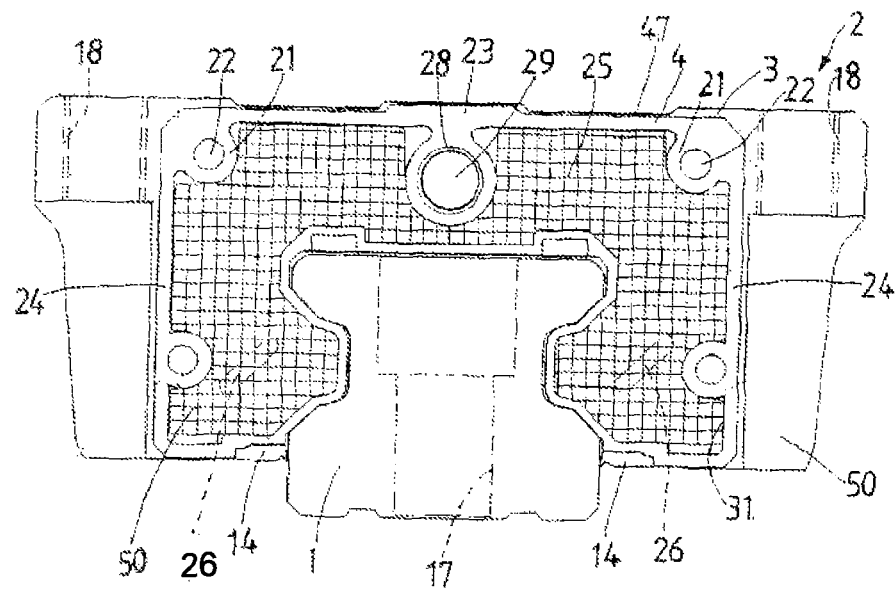
FIG. 4 is a view in front elevation showing a version of a slider, but in which an end seal being removed.
Figure 5:
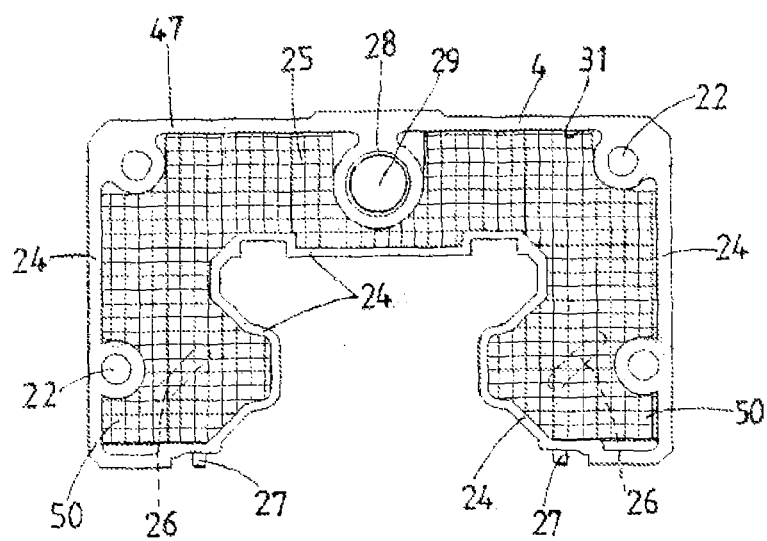
FIG. 5 is a view in front elevation showing the end cap of FIG. 4.

With the linear motion guide unit constructed according to the present invention, especially, the end cap major body 8 in the end cap 4 has a concavity 31 which gets concaved below an outward end surface of the end cap 4 to be surrounded with an exterior frame 24, see FIG. 4, facing directly towards the end seal 15. The concavity 31 is slotted at 37 to open into one of the turnaround passages 30. Inside the concavity 31, there is installed a lubricant reservoir plate 25 of a lubricant applicator. The lubricant reservoir plate 25 is made of a porous or cellular compact impregnated with a plenty of lubricant. The lubricant reservoir plate 25 has an applicator nose 26 of porous texture which is integral with the lubricant reservoir plate 25, and extends through the slot 37 so as to form in part the outside curved half-surface of the turnaround passage 30 and expose a leading edge 46 thereof to the turnaround passage 30. The rolling elements of roller 5, as rolling through the turnaround passage 30, come into touch with an exposed edge 46 of the applicator nose 26. As a result, the rolling elements 5 are applied with the lubricant oozing out of the exposed edge 46 of the applicator nose 26 and the lubricant impregnated in the lubricant reservoir plate 25 is resupplied continuously to the applicator nose 26. With the linear motion guide unit of the present invention, the porous compact to be impregnated with lubricant features the applicator nose 26 has a layer in which the number of pores and the pore size to allow the lubricant flowing through the porous compact are partially or entirely, or at least partially, determined to provide the molded density higher within a desired limitation, compared with the number of pores and the pore size in the lubricant reservoir plate 25. More especially, the applicator nose 26 of the porous compact is molded to have a highly dense layer lying at least partly in the overall length reaching the leading edge 46 exposed to the turnaround passages 30.

Figure 18:
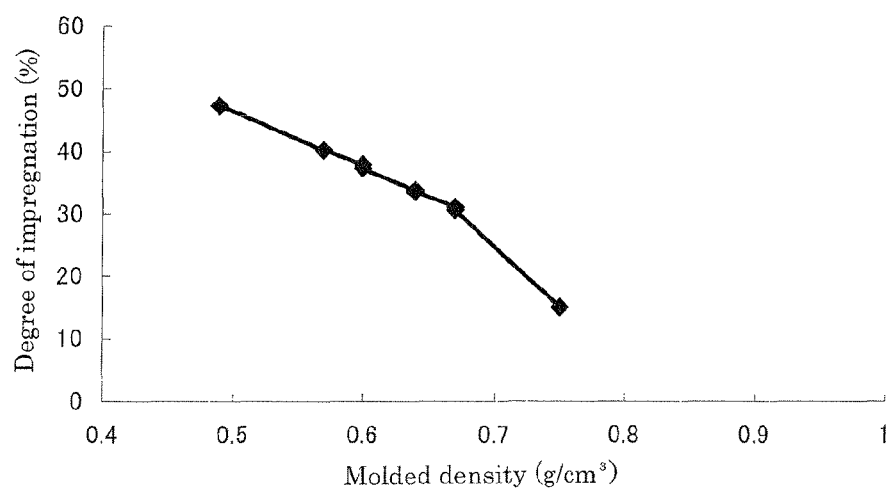
FIG. 18 is a graphic representation to explain a correlation between molded density and degree of lubricant impregnation in the porous compact.

In FIG. 18, there is shown the correlation between the molded density (g/cm$^3$) and the degree of impregnation in the cellular or porous compact which was made into the lubricant reservoir plate 25 and the applicator nose 26. The degree of impregnation now refers to a ratio of porous compact allowed to be impregnated with lubricant, or a volume ratio (%) between a volume of the porous compact impregnated with lubricant and a volume of lubricant preserved in the porous compact. In other words, the degree of impregnation is defined to be equal with porosity of open-cell or open-pore which allows lubricant to flow through there. It will be thus understood that the less the molded density in the porous compact, the greater the continuous pores or cells inside the porous compact, that is, the open-pore size and the number of open-pores in the porous compact. As a result, the less the molded density in the porous compact, the more the amount of lubricant absorbed and preserved in the porous compact, or the degree of impregnation. The porous compact constructed according the present invention lies normally in a state of retaining lubricant inside the open pores under static or rest condition. Once the porous compact comes into contact or engagement over the outward surface or skin thereof with the rolling elements of roller 5 to experience any external force, the lubricant seeps out of the porous compact with using capillary action to apply the lubricant, for example, around the rolling elements 5. Thus, as the pore size and/or the number of pores in the porous compact increase, the lubricant squeezed out of the porous compact is more in quantity than in the porous compact high in molded density. With the porous compact having high molded density, moreover, there is a greater likelihood that the volume of continuous pores or cells, or the open-pore size and the number of open pores inside the porous compact decreases and, therefore, the amount of lubricant absorbed and preserved in the porous compact, or the degree of impregnation, declines with the result of less amount of lubricant oozing out of the porous compact with capillary action, causing tougher application of lubricant around the rolling elements. Observed experimental data showed that the porous compact having the molded density of 0.49 g/cm$^3$ exhibited the degree of impregnation of about 47% and the porous compact having the molded density of 0.67 g/cm$^3$ exhibited the degree of impregnation of about 31%. With the linear motion guide unit with the porous compact constructed as stated earlier, the lubricant reservoir plate 25 of the porous compact had the molded density of 0.40~0.60/cm$^3$. In contrast, the applicator nose 26 of the porous compact was molded to have a highly dense layer at least partially across the overall length reaching the leading edge or skin exposed to the turnaround passages. The molded density of the highly dense layer was in the range of from 0.60 to 0.70/cm$^3$, whereas the applicator nose 26 of the porous compact other than the highly dense layer had the same molded density designed in the lubricant reservoir plate 25. Moreover, the lubricant preserved in the lubricant reservoir plate 25 was resupplied into the applicator nose 26. The porous compact got tougher to absorb lubricant to be impregnated with the lubricant as the molded density increased above 0.70 g/cm$^3$. With the molded density of 0.75 g/cm$^3$, the porous compact got clogged over the skin thereof so that it was tougher to form cells or pores open to the outside and therefore the lubricant was only preserved in a part limited near the skin of the porous compact, with the result of a matter of 15% of the degree of impregnation. With the molded density of above 0.75 g/cm$^3$, there was no formation of the open-cell or open-pore. With the molded density of below 0.40 g/cm$^3$, as opposed to the above, the pore size got too larger while the number of pores got too more to preserve or retain the lubricant inside the porous compact.

Figure 13:
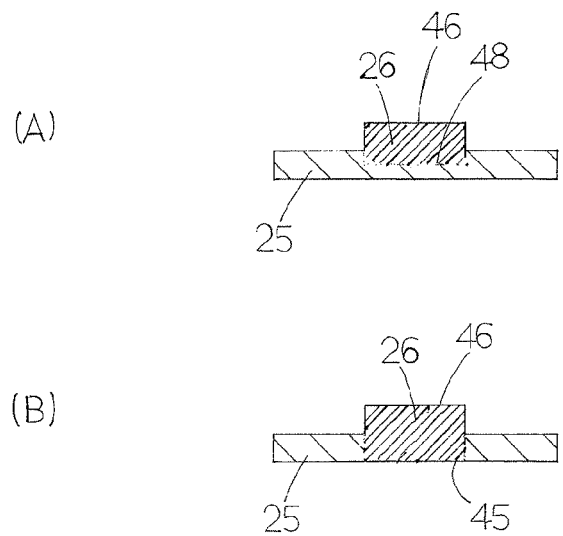
FIG. 13 is a view in transverse section of the lubricant reservoir plate of FIG. 11 taken along the plane of the line I-I of FIG. 11.
Figure 14:
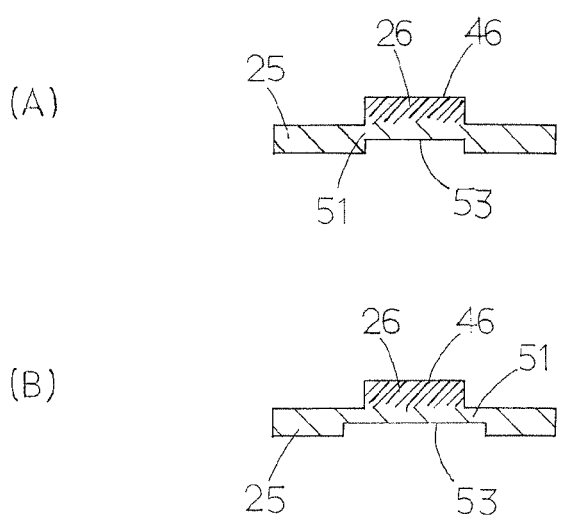
FIG. 14 is a view in transverse section of a modification of the lubricant reservoir plate of FIG. 11 taken along the plane of the line I-I of FIG. 11.
Figure 15:
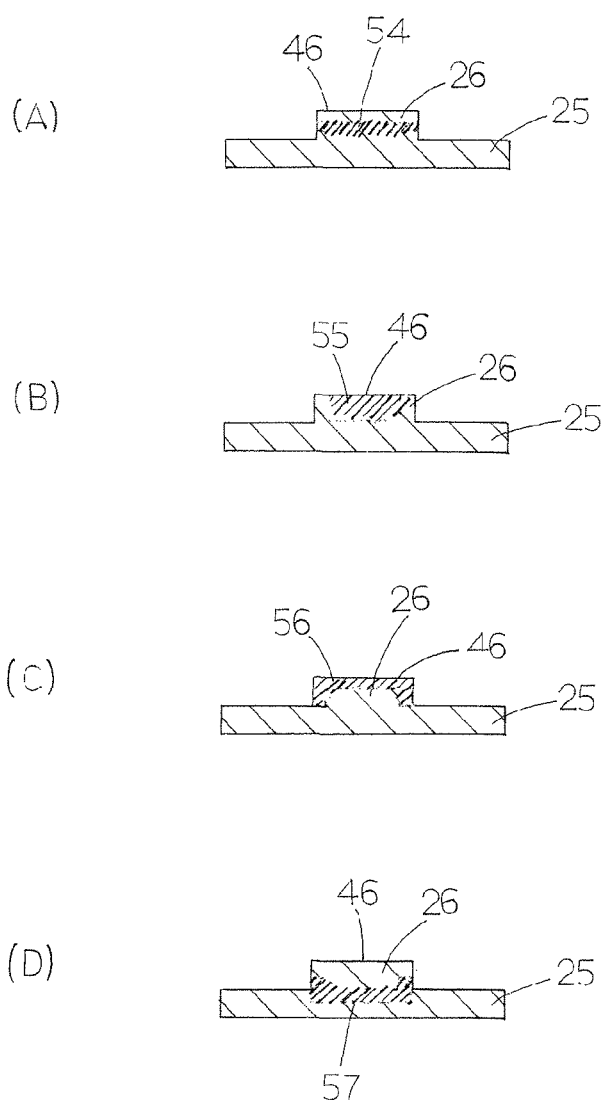
FIG. 15 is a view in transverse section of another modification of the lubricant reservoir plate of FIG. 11 taken along the plane of the line I-I of FIG. 11.

In FIGS. 13(A) and 13(B), layers highly dense in molded density of the applicator nose 26 are shown as being formed across the overall transverse section predetermined in the applicator nose 26. The applicator nose 26 shown in FIG. 13(A) fits into a recession 48 in the lubricant reservoir plate 25 and coalesces with the lubricant reservoir plate 25. The applicator nose 26 shown in FIG. 13(B) fits into a bottomless hole 45 in the lubricant reservoir plate 25 and coalesces with the lubricant reservoir plate 25. With the version as stated just earlier, the lubricant reservoir plate 25 and the applicator nose 26 are prepared separately from each other and then welded together. As an alternative shown in FIGS. 14(A) and 14(B), the lubricant reservoir plate 25 is embossed or pressed to yield the applicator nose 26 and a depression 53 corresponding in reverse to the applicator nose 26. In FIG. 14(A), there is shown a version of the modified lubricant reservoir plate 25, whose rear surface is depressed across a contour corresponding to the applicator nose 26 raised above a front surface of the lubricant reservoir plate 25. In FIG. 14(B), there is shown another version of the modified lubricant reservoir plate 25, whose rear surface is depressed across a contour larger than the applicator nose 26 raised above the front surface of the lubricant reservoir plate 25. The depression 53 is designed to reduce a transverse area at a transition 51 from the lubricant reservoir plate 25 to the applicator nose 26 to throttle or restrict a lubricant flow at the transition 51. With the versions shown in FIGS. 14(A) and 14(B), the applicator nose 26 fuses together with the lubricant reservoir plate 25 at the location lopsided with respect to the middle of the lubricant reservoir plate 25 in thickness direction towards one side above which the applicator none 26 rises. The lubricant reservoir plate 25 and the applicator nose 26 are produced by using molding or casting in a single operation or at the same time and then welded or fused together with each other. As an another alternative shown in FIGS. 15(A) to 15(D), the lubricant reservoir plate 25 and the applicator nose 26 are shaped separately and then welded or fused together with each other. In FIG. 15(A), a layer 54 having the molded density higher than in the lubricant reservoir plate 25 is shown as lying across the overall transverse section in the applicator nose 26. In FIG. 15(B), a layer 55 higher in the molded density is made deep around the middle in the transverse section of the applicator nose 26. In FIG. 15(C), a layer 56 higher in the molded density is made concentrated across the leading edge or skin 46 of the applicator nose 26, which is exposed to come into touch with the rolling elements of roller 5 to apply lubricant around the rolling elements. In FIG. 15(D), a layer 57 higher in the molded density is made at a location where the applicator nose 26 is fused or welded together with the lubricant reservoir plate 25.

With the linear motion guide unit of the present invention, the porous compact to provide the lubricant reservoir plate 25 and the applicator nose 26 is made of finely powdery ultra-high molecular weight synthetic resin, which is first subjected to compacting and the resulting compact is subsequently sintered at elevated temperature. In the sintered compact, the fine particles of the powdery synthetic resin partially coalesce with each other with leaving intercommunicating voids to provide open-porous or open-cellular texture whose pores or cells preserved among fine particles are open each other through interstices or channels. Lubricant is well absorbed and preserved in the pores or cells in the porous compact. As the mass per unit volume of the porous compact, or the molded density ($g/cm^3$), becomes large to be densified, the interstices or channels among the fused particles become smaller or narrower to lessen the pores or cells opened to the outside. Meanwhile, the preferred powdery synthetic resin may be selected from polyethylene, polypropylene, tetrafluoroethylene copolymer and so on. The fine particles of ultra-high molecular weight polypropylene are better in preservation of the accurate dimensions of the molded compact and in wear resistance of the sintered resinous material. The porous compact of the sintered resinous material has no need of any other reinforcement and further is tougher to be worn. Thus, the porous compact of the sintered resinous material, because of hard to be clogged with wear debris, succeeds in resupplying lubricant around the rollers 5 and further on the load-carrying races 20 via the rollers 5 over the prolonged service intervals. The fine particles of ultrahigh molecular weight polypropylene have a granule size of, for example 30 μm and a coarse grain size of from 250 to 300 μm. The ultrahigh molecular weight polypropylene having the properties as stated earlier, after sintered with application of pressure, produced the porous compact of open-pore texture having the porosity of, for example, from 40 to 50%.

Figure 16:
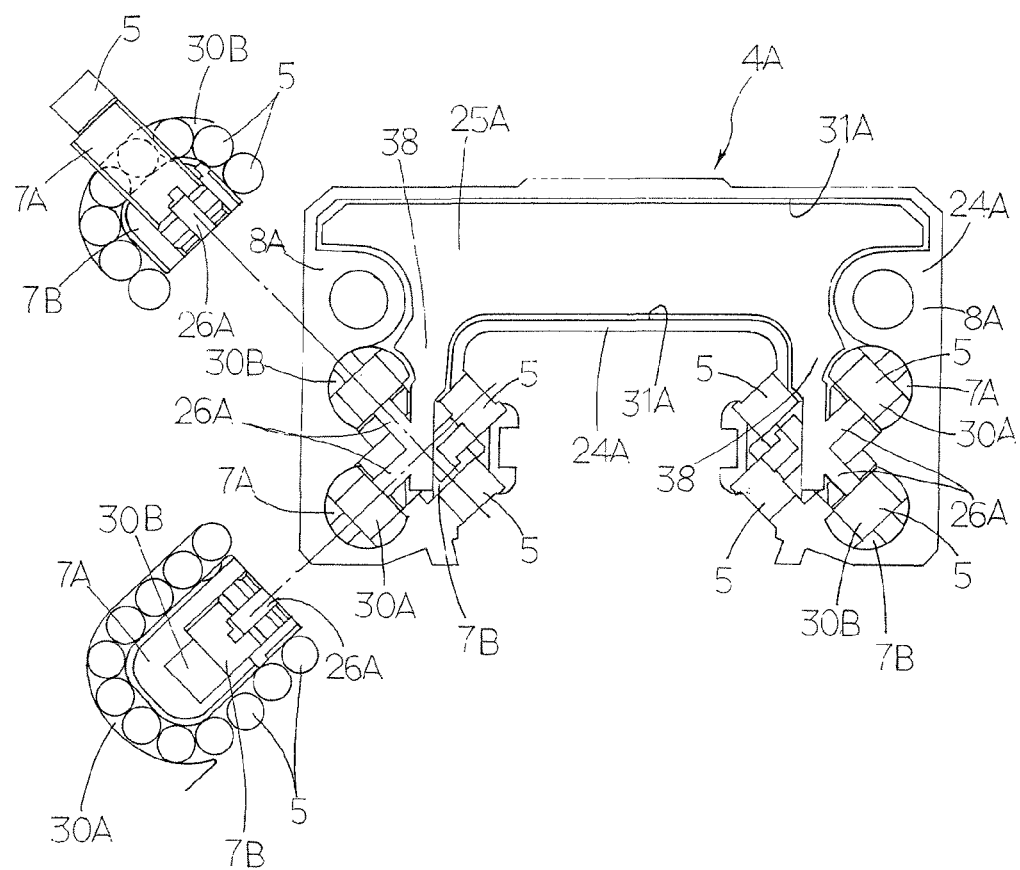
FIG. 16 is a view in front elevation showing another embodiment of the linear motion guide unit constructed according to the present invention, especially one of lengthwise opposite ends of a carriage built in the slider. Depicted at left are views explanatory of turnaround passages.
Figure 17:
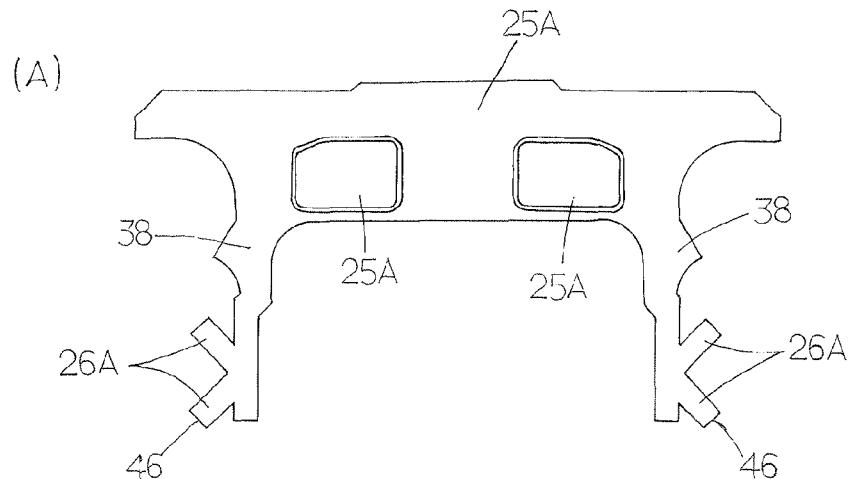
FIG. 17 is to illustrate a porous compact shown in FIG. 16.

Next referring to FIGS. 16 and 17, there is shown another embodiment of the linear motion guide unit constructed according to the present invention. This embodiment, although but the same in basic technical concept with the embodiment described earlier, is distinctive in the shape and arrangement of a lubricant reservoir plate 25A in an end cap 4A. The detailed construction of a lubricant reservoir plate 25A and an applicator nose 26A is disclosed in the commonly assigned US Publication 2011-0176754-A1, published on Jul. 21, 2011, a US counterpart of Japanese Laid-Open Patent Application No. 2010-10 123 which is incorporated herein by reference. The lubricant reservoir plate 26A fits in a concavity 31A which sinks below an inward end surface, facing the carriage 3, of an end cap major body 8A to be surrounded with a frame 24A, and a slot 37A made in the end cap major body 8A leads to any one of the inside curved half-surfaces 52 of the turnaround passages 30 defined with either of spacer parts 7A or 7B. The lubricant reservoir plate 25A has applicator noses 26A which are made integrally with the lubricant reservoir plate 25A and extended to come into engagement with the spacer parts 7 which define the inside curved half-surfaces 52 of the turnaround passages 30. The lubricant reservoir plate 25A is fused together with the applicator noses 26A which get forked off each other to extend through the slots 37A to expose them to the turnaround passages 30. This forked applicator nose 26A is what makes this embodiment different from the first embodiment stated earlier. The applicator noses 37 are welded together with extensions 38 constituting parts of the lubricant reservoir plate 25A. Thus, the applicator noses 37 are communicated with the lubricant reservoir plate 25A through the extensions 38 so that the lubricant is resupplied from the lubricant reservoir plate 25A into the applicator noses 26A through the extensions 38.

Figure 19:
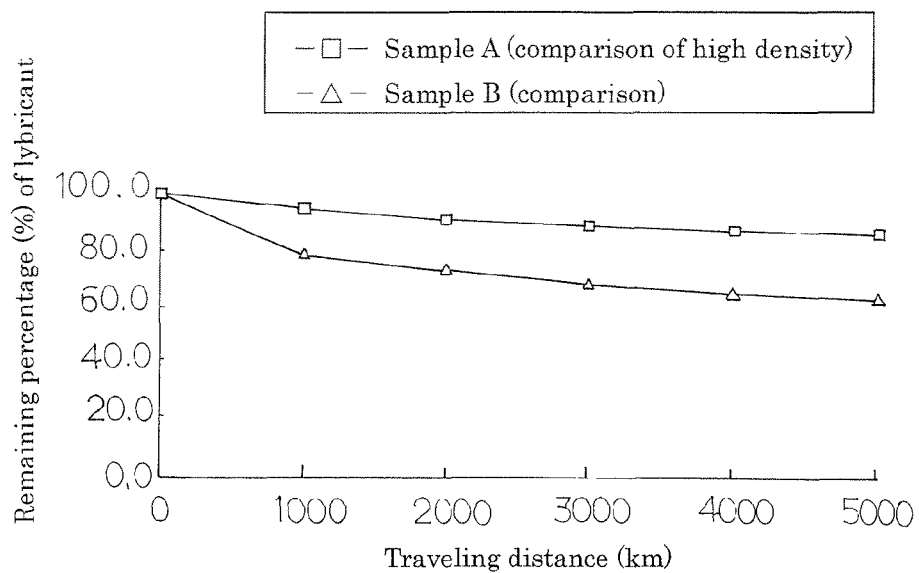
FIG. 19 is a graphic representation to explain remaining amounts of lubricant relative to traveling distance in samples A and B of porous compacts to provide the lubricant reservoir plate and the applicator nose.

For taking the gauge of advantages of the porous compact for the lubricant reservoir plate of the present invention over the prior porous compact for the lubricant reservoir plate, samples A and B of the lubricant reservoir plates made of the prior porous compact were first prepared. The porous compact for the sample B had the molded density in the range of from 0.50 to 0.60 $g/cm^3$ and the mean density of 0.57 $g/cm^3$, whereas the prior porous compact for the sample A had the molded density in the range of from 0.60 to 0.70 $g/cm^3$ and the mean high-density up to 0.66 $g/cm^3$. In FIG. 19, there is shown the results of experimental measurements of remaining percentage (%) of lubricant which was still preserved in each of the samples (A) and (B) after sliding travels over any significant distance of the linear motion guide units in which the sample (A) or (B) was built in respectively.

The operating conditions to measure the remaining percentage (%) of lubricant were as follows.

1. Equipment used for the experiments: linear motion guide units in which the lubricant reservoir plates were installed, and the rolling element was the roller and the guide rail had a head of 45 mm in width.

2. Posture: The horizontal, the guide rail was set on the experimental site in horizontal posture.

3. Loading conditions: 3780 (N), a matter of 3% of the basic dynamic load rating of the linear motion guide units.

4. Direction of the load: The direction heading from the upper surface of the slider towards the top face of the guide rail.

5. Operating velocity: 120 m/min.

6. Stroke: 720 mm.

As seen from FIG. 19, it was found that the remaining percentage of lubricant in the sample B continued to fall largely over the traveling distance less than 1,000 km, compared with in the sample A. This tendency of rapid decrease in the remaining percentage of lubricant at early stages after the beginning of operation was in common regardless of the size and/or length of the linear motion guide unit. Moreover, other experiments proved that the remaining percentage of lubricant from 10,000 km of the traveling distance went with roughly fixed decline rates. With the sample B impregnated with a plenty of lubricant, a bit too much lubricant was initially applied to the rolling elements through the open-pores in the porous compact. After the lubricant preserved in the sample B has declined down to a certain amount, however, the sample B came into a gentle condition in which the sample B continued to apply only an amount of lubricant necessary and sufficient to lubricate the rolling-contact areas between the rolling elements and the load-carrying races. The sample A, as opposed to the sample B, was made of the porous compact in which the pores were less in number and smaller in size and, therefore, the amount of lubricant applied to the rolling elements was ever controlled to necessary and sufficient amount from just after the beginning of the operation. With the porous compact in the sample A having the pores or cells less in number and smaller in size than in the sample B, moreover, the amount of lubricant allowed to be preserved in the sample A was less than in the sample A.

On the basis of the experimental results as stated earlier, it was found to be preferable to constitute the lubricant reservoir plate 25 with the sample B better in preservation of a plenty of lubricant and the applicator nose 26 with the sample A higher in density to make sure of the controlled application of lubricant as same as in the sample A which was entirely high in density. That is, it was envisaged making only the applicator nose 26 higher in density to adequately control the amount of lubricant applied to the rolling elements, with using the capillary action. Thus, it had proved to be viable to make the porous compact highly denser at only the desired location to keep the decrease in lubricant preserved in the lubricant reservoir plate 25 at a minimum, thereby prolonging effectively the service life in lubrication.

Figure 20:
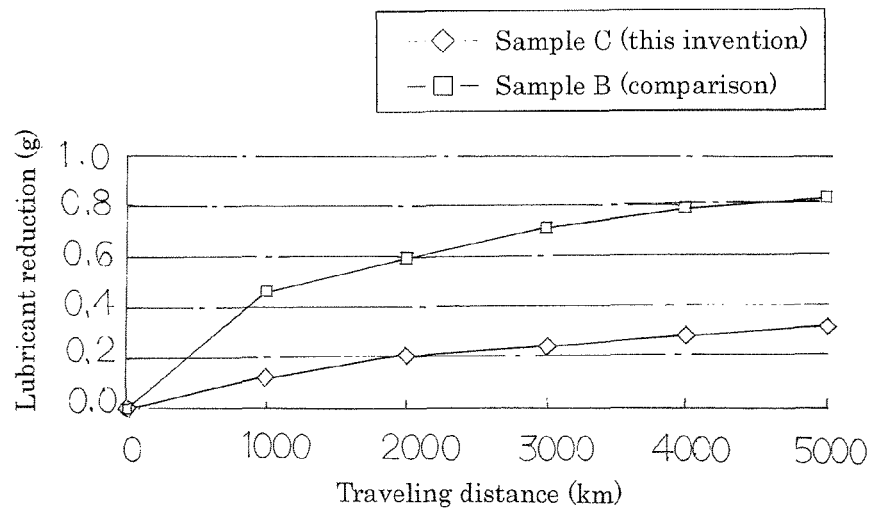
FIG. 20 is a graphic representation to explain remaining amounts of lubricant relative to traveling distance in porous compacts of samples B and C of porous compacts to provide the lubricant reservoir plate and the applicator nose.
Figure 21:
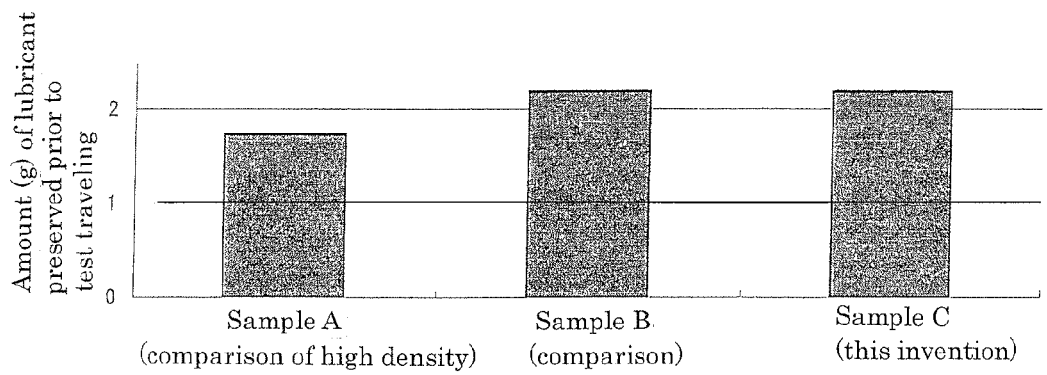
FIG. 21 is a graphic representation showing amounts of lubricant impregnated in the samples A, B and C of porous compacts and detected before testing them on the slider.

With a sample C constructed according to the present invention, the lubricant reservoir plate of the present invention was prepared by the porous compact having the molded density of 0.57 g/cm$^3$ and the applicator nose was prepared by the porous compact having the molded density in the range of from 0.63 to 0.66 g/cm$^3$ and the mean high-density up to 0.65 g/cm$^3$. In FIG. 20, there is shown the measured results of the reduction in amount of lubricant vs. the traveling distance in a sample C of this invention in comparison with the sample B. As seen in FIG. 20, the sample C of this invention densified at only the application nose exhibited the tendency substantially identical with the sample A which was densified in its entirety. In FIG. 21, there are shown the amounts of lubricant preserved respectively in the porous compacts in the samples A, B and C, which were measured preparatory to the test traveling. As apparent from FIG. 21, the amount of lubricant preserved in the sample C of this invention preparatory to the test traveling was as high as in the sample B, but more than in the sample A. Thus, the sample C of this invention, as more in the amount of lubricant preserved than in the sample A and less in a decline in the amount of lubricant preserved than in the sample A, had proven to prolong more the service life of lubrication in the linear motion guide unit, compared with the samples A and B.

In the following, there will be described how the porous compacts in the first and second versions of the present invention had been prepared with reference to images taken by a scanning electron microscope, hereinafter abbreviated to SEM, to discern the constructional markings and specific locations in the porous compacts.

Figure 22:
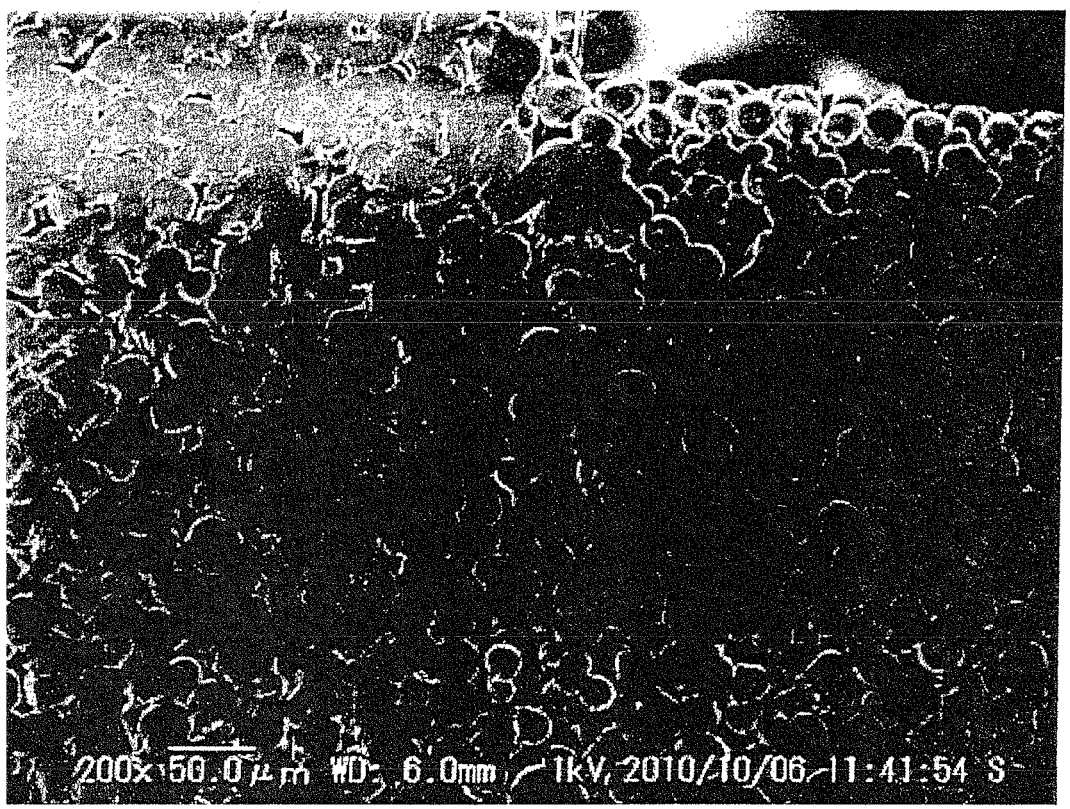
FIG. 22 is a scanning electron microscope, commonly abbreviated to SEM, image at 200 times magnification of around juncture area in transverse section where a major lubricant reservoir of molded density of 0.56 g/cm$^3$ and an applicator nose of molded density of 0.65 g/cm$^3$ coalesced with one another by heating to suitable temperature with the application of pressure.

With the first version of the porous compact in which the lubricant reservoir plate and the applicator nose were prepared separately from each other, the applicator nose was first densified in a mold under great pressure together with the application of heat. At time of molding the lubricant reservoir plate under high pressure with the application of heat, the resulting application nose was combined with the lubricant reservoir plate to coalesce or merge integrally with each other. Although but the applicator nose and the lubricant reservoir plate were different in their molded densities of 0.65 g/cm$^3$ and 0.56 g/cm$^3$, their grains at a juncture area came into strong coalescence to weld securely the applicator nose with the lubricant reservoir plate. The foremost surface of the applicator nose to come into contact with the rolling elements and the juncture area between the applicator nose and the lubricant reservoir plate were taken by the SEM in a transverse section passing through the lubricant reservoir plate around the applicator nose along a direction intersecting a lengthwise direction of the applicator nose. In FIG. 22, there is shown an image at 200 times magnification of the transverse section passing through the lubricant reservoir plate and the applicator nose in the first version of the porous compact.

Figure 23:
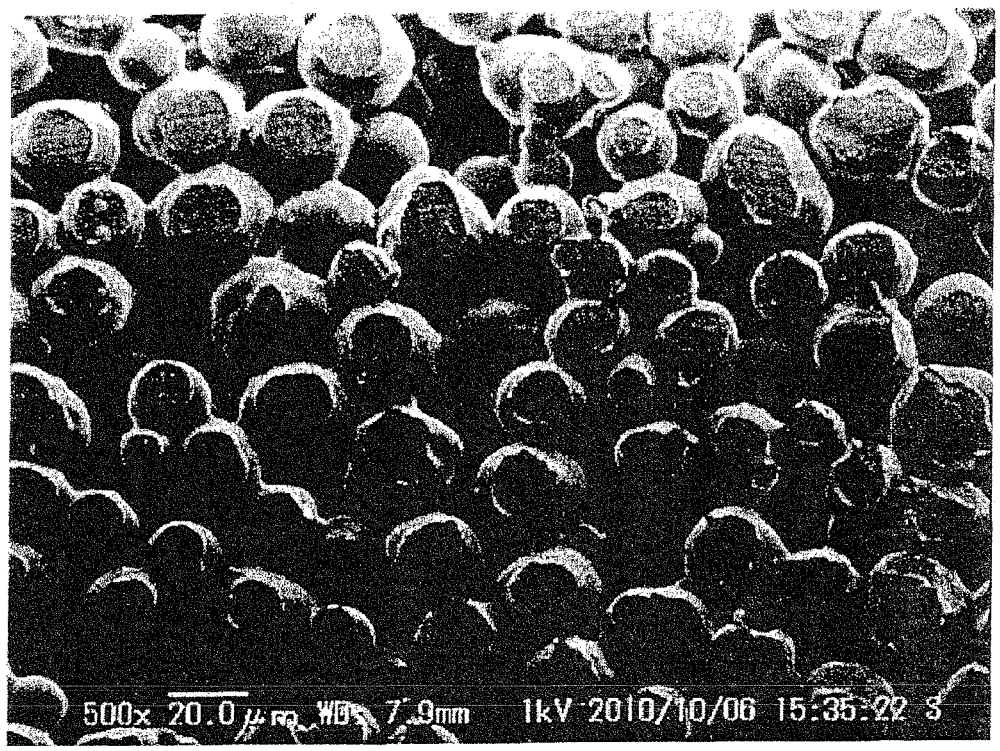
FIG. 23 is a SEM image at 500 times magnification of a tip of the applicator nose exposed to form in part a wall surface of the turnaround passage, coming into touch with the rolling elements.

Further in FIG. 23, there is shown a SEM image at 500 times magnification of a tip or leading edge of the applicator nose in the first version exposed to form in part a wall surface of the turnaround passage. The foremost surface of the applicator nose is envisaged coming into touch with the rolling elements to apply lubricant around the rolling elements. The applicator nose, after having densified by itself under great pressure together with the application of heat, was molded again under high pressure with the application of heat simultaneously with the molding process of the lubricant reservoir plate. After investigating the image of the foremost surface of the applicator nose taken by the SEM, it was identified that, though some spherical grains coalesced together, there were left sufficient interstices or channels which appeared as shades among the partially fused grains. This SEM image proved the porous compact preserved the open-pore texture without subjected to any adverse influence by the reheating. Thus, it is said that the porous compact underwent less changes in fused state, grain density and porosity.

Figure 24:
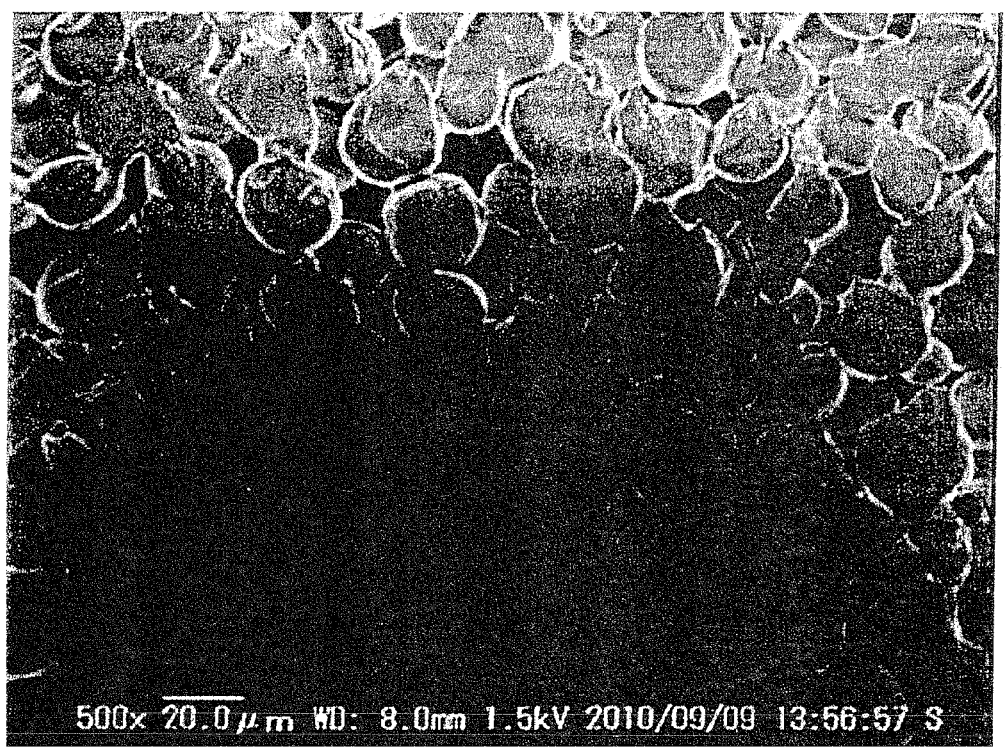
FIG. 24 is a SEM image at 500 times magnification of the lubricant reservoir plate in transverse section of molded density of 0.58 g/cm$^3$ which was molded at the same time as the applicator nose by heating to suitable temperature with the application of pressure.
Figure 25:
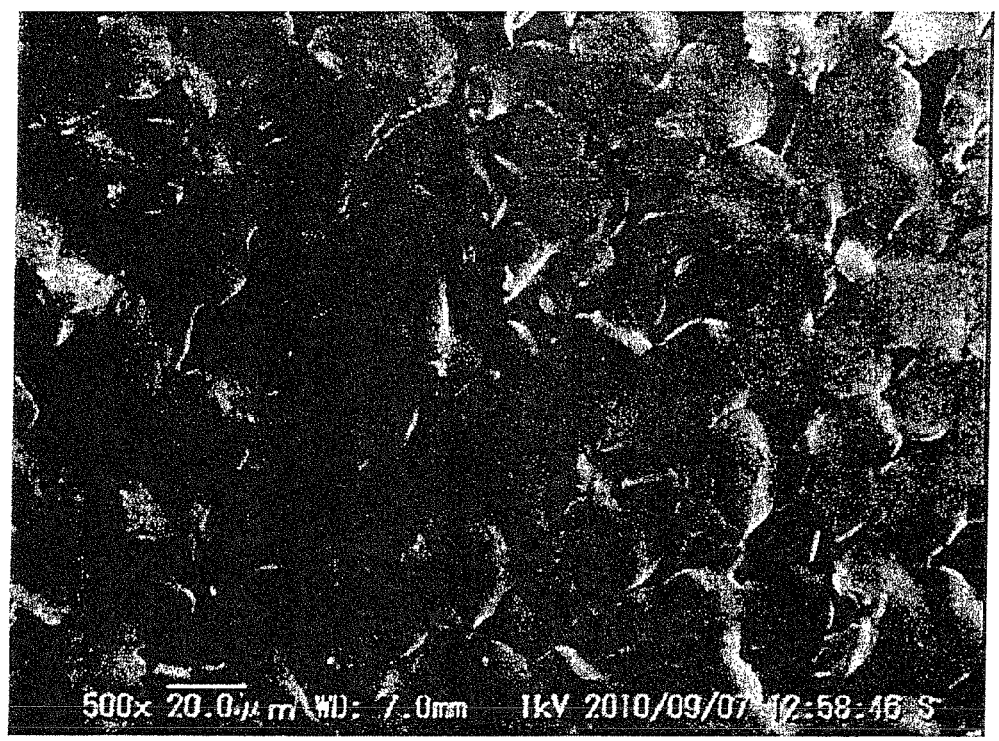
FIG. 25 is a SEM image at 500 times magnification of the applicator nose in transverse section of molded density of 0.66 g/cm$^3$ which was molded at the same time as the lubricant reservoir plate by heating to suitable temperature with the application of pressure.

With the second version of the porous compact in which the lubricant reservoir plate and the applicator nose were molded simultaneously with each other under high pressure with the application of heat to fuse together around their boundaries, the applicator nose was densified under more pressure than in the lubricant reservoir plate, so that the applicator nose had the molded density of 0.66 g/cm$^3$ and the lubricant reservoir plate had the molded density of 0.58 g/cm$^3$. In the second version of the porous compact prepared as stated earlier, the upper half-part of the mold used under to high pressure with the application of heat, not shown here, had a protrusion serving as a compression interference to make the leading edge of the applicator nose higher or denser in molded density than in the middle area of the lubricant reservoir plate or in the back of the lubricant reservoir plate where there was no applicator nose. It was observed in the SEM image that the lubricant reservoir plate and the applicator nose, through differing from each other in molded density and also in pressure exerted in molding operation, were joined merged together, where the spherical grains got coalesced together to form the interstices or channels which appeared as shades among the partially fused grains. With the applicator nose higher in molded density in the porous compact, the grains were pressed harder together among themselves than in the lubricant reservoir plate to make the interstices or channels smaller or narrower in size. With the second version constructed as stated just above, the open-pores or cells formed in the porous compact densified in molding density diminished in size as well as in number to make the interstices or channels for lubricant flow narrower in size and less in number, thereby imposing restrictions on the amount of lubricant which would forced out by the capillary action from the lubricant reservoir plate to the rolling elements through the applicator nose as in the first version. In FIG. 24, there is shown a SEM image at 500 times magnification of the lubricant reservoir plate in transverse section thereof. In FIG. 25, moreover, there is shown a SEM image at 500 times magnification of the applicator nose in transverse section. The powdery ultrahigh molecular weight polypropylene used to prepare the lubricant reservoir plate included fine grains of in the range of from 30 to 40 μm in granule size and coarse grains of from 250 to 300 μm in granule size. The granule size of the grains would be understood with reference to the scale of 20 μm shown in the bottom of the SEM image. In either SEM images, the grains can be identified to be fused by pressing together under high pressure with the application of heat. Especially in the SEM image of the applicator nose in transverse section thereof, the interstices or channels are observed to be shaped among the grains to communicate with each other.

The applicator nose at the leading edge thereof was densified up to 0.66 g/cm$^3$ in molded density and the lubricant reservoir plate at the middle area thereof was formed to have the molded density of 0.58 g/cm$^3$. The porous compact had the open-pore or open-cell structure having the porosity of 40~50%. The applicator nose at the leading edge thereof was found to be higher in molded density in the porous compact to render the interstices or channels among the coalescence of the grains small or narrow in size after comparisons were made with the lubricant reservoir plate. As a result, it was confirmed that the open-pores or cells formed in the densified porous compact diminished in size as well as in number to make the interstices or channels for lubricant flow narrower in size and less in number, thereby imposing restriction s on the amount of lubricant which would forced out by the capillary action from the lubricant reservoir plate to the rolling elements through the applicator nose.

What is claimed is:

1. A linear motion guide unit prolonged in service life for lubrication comprising an elongated guide rail, a slider movable lengthwise of the elongated guide rail in a sliding manner, and a rolling element allowed to roll through a load-carrying race defined between the guide rail and the slider;

wherein the slider has a carriage, end caps and end seals, the carriage having a return passage extending in parallel with the load-carrying race, the end caps being fastened on forward and aft end surfaces of the carriage, one to each end surface, and provided therein with turnaround passages to join together the load-carrying race and the return passage, and the end seals being attached on outward end surfaces of the end caps;

wherein the end caps each have a lubricant applicator constituted with a lubricant reservoir plate and an applicator nose, the lubricant reservoir plate being made of a porous compact having open pores impregnated with lubricant, the applicator nose being made of a porous compact which has open pores and protrudes from the lubricant reservoir plate, the applicator nose having a leading edge which extends through a hole in the end cap to come into touch with the rolling element rolling though the turnaround passages, and the lubricant reservoir plate being integral with the applicator nose through coalescence of fine particles of ultra molecular weight synthetic resins in the porous compact;

wherein the applicator nose has at least a layer in the porous compact, which is densified in molded density to have pores less in pore size and pore number than in the lubricant reservoir plate so as to restrict an amount of lubricant flowing across the layer;

wherein the leading edge of the applicator nose comes into touch with the rolling element to apply the lubricant around the rolling element while rolling through the turnaround passages; and wherein the applicator nose of the porous compact has the molded density of from 0.60 to 0.70 g/cm$^2$, and the lubricant reservoir plate of the porous compact has the molded density of from 0.40~0.60 g/cm$^3$.

2. A linear motion guide unit prolonged in service life for lubrication constructed as defined in claim 1, wherein the applicator nose has at least a layer lying within an overall length reaching the leading edge of the applicator nose, the layer being densified in the molded density.

3. A linear motion guide unit prolonged in service life for lubrication constructed as defined in claim 1, wherein the lubricant reservoir plate fits into a concavity which gets concaved below the outward end surface of the end cap to open onto the end seal, and the hole in the end cap is open to an outside curved half-surface of the turnaround passage.

4. A linear motion guide unit prolonged in service life for lubrication constructed as defined in claim 1, wherein the lubricant reservoir plate fits into a concavity which gets concaved in the end cap to open onto the carriage, and the hole in the end cap is open to an inside curved half-surface of the turnaround passage.

5. A linear motion guide unit prolonged in service life for lubrication constructed as defined in claim 1, wherein the applicator nose fits into a recession or a bottomless hole in the lubricant reservoir plate and coalesces with the lubricant reservoir plate.

6. A linear motion guide unit prolonged in service life for lubrication constructed as defined in claim 1, wherein the lubricant reservoir plate is reduced in transverse area to fit over the applicator nose, thereby throttling a lubricant flow from the lubricant reservoir plate into the applicator nose.

* * * * *